United States Patent
Joshi et al.

(10) Patent No.: US 12,504,960 B2
(45) Date of Patent: Dec. 23, 2025

(54) OPTIMIZING LEGACY APPLICATION DEPLOYMENT USING DERIVED IMAGES IN HYPERSCALERS

(71) Applicant: SAP SE, Walldorf (DE)

(72) Inventors: Himanshu Joshi, Bangalore (IN); Preeti Rani Deka, Bangalore (IN); Penumatsa Naveen Varma, Bangalore (IN); Suneel Veerasetti, Bangalore (IN); Ankit Midha, Bangalore (IN); Santhosh Puttaswamygowda, Bangalore (IN)

(73) Assignee: SAP SE, Walldorf (DE)

( * ) Notice: Subject to any disclaimer, the term of this patent is extended or adjusted under 35 U.S.C. 154(b) by 272 days.

(21) Appl. No.: 18/511,521

(22) Filed: Nov. 16, 2023

(65) Prior Publication Data
US 2025/0165241 A1    May 22, 2025

(51) Int. Cl.
G06F 8/61    (2018.01)
(52) U.S. Cl.
CPC ..................... G06F 8/63 (2013.01)
(58) Field of Classification Search
CPC ..................... G06F 8/61; G06F 8/63
See application file for complete search history.

(56) References Cited

U.S. PATENT DOCUMENTS

| | | | | |
|---|---|---|---|---|
| 8,245,222 | B2 * | 8/2012 | Chalupa | G06F 8/61 717/174 |
| 11,449,320 | B2 | 9/2022 | Banerjee et al. | |
| 11,526,497 | B2 | 12/2022 | Banerjee et al. | |
| 2004/0268345 | A1 * | 12/2004 | Lodwick | G06F 8/71 717/176 |
| 2018/0253320 | A1 * | 9/2018 | Emejulu | G06F 8/63 |
| 2023/0045103 | A1 | 2/2023 | Joshi et al. | |
| 2023/0091915 | A1 * | 3/2023 | Chen | G06F 8/658 717/168 |

\* cited by examiner

*Primary Examiner* — Marina Lee
(74) *Attorney, Agent, or Firm* — Fish & Richardson P.C.

(57) ABSTRACT

Methods, systems, and computer-readable storage media for providing, in a repository of a cloud computing environment, a set of images that are executable to deploy one or more instances of an application to the cloud computing environment, the set of images including a base image, one or more intermediate derived images, and one or more final derived images, executing the base image and the one or more intermediate derived images to configure the cloud computing environment for deployment of at least one instance of the application and to install one or more packages used by instances of the application, and executing the one or more final derived images to instantiate that at least one instance of the application within the cloud computing environment.

20 Claims, 5 Drawing Sheets

OPTIMIZING LEGACY APPLICATION DEPLOYMENT USING DERIVED IMAGES IN HYPERSCALERS

BACKGROUND

Cloud computing can be described as Internet-based computing that provides shared computer processing resources, and data to computers and other devices on demand. A common architecture in cloud platforms includes services (also referred to as microservices), which have gained popularity in service-oriented architectures (SOAs). In such SOAs, applications are composed of multiple, independent services that are deployed in standalone containers with well-defined interfaces. The services are deployed and managed within the cloud platform and run on top of a cloud infrastructure. For example, an application that is deployed to a cloud platform can be composed of a set of services that are executed within the cloud platform. Each service is itself an application (e.g., a Java application) and one or more instances of a service can execute within the cloud platform.

Cloud-based applications can be executed in one or more data centers that can be configured with hyperscalers. A hyperscaler enables scaling of resources on demand within a data center. For example, a hyperscaler enables technical resources (e.g., memory, processors, network) to be dynamically added/removed from nodes within a cloud platform.

In modern software deployments, containerization is implemented, which can be described as operating system (OS) virtualization. In containerization, services are run in isolated spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructures. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management. The container orchestration system can scale a number of containers, and thus resources to execute services that make up one or more applications.

SUMMARY

Implementations of the present disclosure are directed to optimized deployment of applications to cloud platforms using derived images. More particularly, implementations of the present disclosure are directed to an image derivation system that enables deployment of applications using a set of images. In some examples, the set of images includes a base image, one or more intermediate derived images, and one or more final derived images. The final derived images are specific to respective programming languages and are used to instantiate instances of application components within containers on a cloud platform.

In some implementations, actions include providing, in a repository of a cloud computing environment, a set of images that are executable to deploy one or more instances of an application to the cloud computing environment, the set of images including a base image, one or more intermediate derived images, and one or more final derived images, executing the base image and the one or more intermediate derived images to configure the cloud computing environment for deployment of at least one instance of the application and to install one or more packages used by instances of the application, and executing the one or more final derived images to instantiate that at least one instance of the application within the cloud computing environment. Other implementations of this aspect include corresponding systems, apparatus, and computer programs, configured to perform the actions of the methods, encoded on computer storage devices.

These and other implementations can each optionally include one or more of the following features: execution of the one or more final derived images includes, for each final derived image, executing a common script; the common script includes at least a portion of each custom script in a set of custom scripts, the set of custom scripts being executable to deploy the application in a private computing environment; actions further include executing the one or more final derived images to instantiate at least one additional instance of the application within the cloud computing environment, the at least one additional instance of the application using one or more of configurations and packages installed through execution of one or more of the base image and the one or more intermediate derived images; execution of the base image, the one or more intermediate derived images, and the one or more final derived images is performed in response to determining that the at least one instance of the application is to be deployed to the cloud computing environment; each final derived image is specific to a programming language; and each of the one or more intermediate derived images includes a reference to the base image, and each of the one or more final derived images comprising a reference to at least one intermediate derived image.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to optimized deployment of applications to cloud platforms using derived images. More particularly, implementations of the present disclosure are directed to an image derivation system that enables deployment of applications using a set of images. In some examples, the set of images includes a base image, one or more intermediate derived images, and one or more final derived images. The final derived images are specific to respective programming languages and are used to instantiate instances of application components within containers on a cloud platform.

Implementations can include actions of providing, in a repository of a cloud computing environment, a set of images that are executable to deploy one or more instances of an application to the cloud computing environment, the set of images including a base image, one or more intermediate derived images, and one or more final derived images, executing the base image and the one or more intermediate derived images to configure the cloud computing environment for deployment of at least one instance of the application and to install one or more packages used by instances of the application, and executing the one or more final derived images to instantiate that at least one instance of the application within the cloud computing environment.

In some instances, an application can include a multi-tenant, software-as-a-service (SaaS) application that is deployed using a collection of customized scripts. Such an application can be referred to as a legacy application and can include components written in disparate programming languages. The customized scripts can be developed over time as releases and/or updates to the application are deployed. As such, the deployment framework may be considered highly customized to the specific legacy application that is to be deployed in a cloud platform. Further, the application can be hosted at a data center. In some instances, one or more of the following scenarios can arise: scale the application in the data center, and/or a deploy the application to one or more other regions (e.g., deploy the application to other data centers).

Deployment to a cloud platform based on customized scripts, however, presents multiple technical issues. More particularly, the customized scripts are executed in a specific order to maintain flow between the steps and to shift the application between states. As such, the deployment environment is highly customized and is usually hosted within a private cloud platform on a data center that is controlled by the enterprise that operates the application. This works, until the enterprise needs to rapidly expand into new regions and also expand the capacity of existing data centers. Faced with this need for rapid expansion, most enterprises attempt to leverage public cloud platforms (e.g., Google Cloud Platform (GCP), Amazon Web Services (AWS), Microsoft Azure) to meet the needs to capacity expansion on deployment to new geographical regions.

However, the customized scripts may not work well with the disparate deployment technologies of public cloud platforms. To illustrate this, certain cloud technologies, such as containers (which refers to the delivery of software in packages isolated from one another and bundled to include their own software, libraries, and configuration files) and internode communications, may not operate seamlessly and properly across different cloud platforms. For example, a container image can be provided as an executable package of software having code, runtime, system tools, system libraries and settings needed to run an application. At runtime, the container image is used to provide a container, within which an application executes.

Shifting to deploying an application to a public cloud environment using custom scripts presents several challenges. For example, for a given application, the same set of custom scripts has to be executed in each cloud environment that the application is to be deployed to. However, the custom scripts and methods do not work well with the new generation of deployment landscapes, such as hyperscalers, which deploy and monitor containers. The assumptions about the deployment environment (which are based on a private cloud environment) no longer hold for the public cloud environment and results in the application not functioning properly. As another example, and as noted above, different public cloud platforms have different deployment technologies, such that a deployment on one is different from a deployment on another. Further, execution of custom scripts can be resource- and time-inefficient depending on the particular monitoring methodology used by a hyperscaler for a container timeout and marking a container as unstable.

One potential approach to address these issues is to adjust settings of the orchestration engine (e.g., Kubernetes) of the cloud platform. However, such settings are at the system level and would affect all deployed applications to that cloud platform. This is impractical, however, because customizing the settings for a legacy application would have a negative impact on other applications that are deployed to the same cloud environment.

In view of the foregoing, implementations of the present disclosure provide for optimized deployment of applications to cloud platforms using derived images. In some implementations, an image derivation system is provided and enables deployment of applications using a set of images. In some examples, the set of images includes a base image, one or more intermediate derived images, and one or more final derived images. The final derived images are specific to respective programming languages and are used to instantiate instances of application components within containers on a cloud platform. In some examples, the final derived images each include a common script that is provided from a set of custom scripts that are executed for deployment of the application in a first cloud platform (e.g., a private cloud platform), while the one or more final derived images are used to deploy the application in a second cloud platform (e.g., a public cloud platform). Each final derived image is a container image, which can be described as a computer-readable file that contains computer-executable code that can be executed to run an isolated process (e.g., application deployment) on a cloud infrastructure. In some examples, a container image can include code, system libraries, system tools, platform settings, and the like, which the application requires to be deployed to and executed within a containerization platform. The container image is processed to deploy an instance of the application (e.g., a component of the application) to a container within the cloud platform.

As described in further detail herein, implementations of the present disclosure enable resource- and time-efficient deployment and execution of custom scripts (e.g., developed over years for a legacy multi-tenant SaaS application) in cloud environments that implement technologies, such as containers and managed orchestrations, while retaining the characteristics of the legacy application. Example characteristics can include the runtime behavior of the application in response to user actions (e.g., creation of a procurement request, viewing data flows).

Implementations of the present disclosure are described in further detail herein with reference to an example container orchestration system. The example container orchestration system is provided as Kubernetes. However, it is contemplated that implementations of the present disclosure can be realized using any appropriate container orchestration system. Implementations of the present disclosure are also described in further detail herein with reference to an example container image, which includes a Docker container image. Docker is provided by Docker, Inc., and can be described as an open platform for developing, shipping, and running applications within containers provisioned in cloud platforms. It is contemplated, however, that implementations of the present disclosure can be realized using any appropriate container platform.

Figure 1:
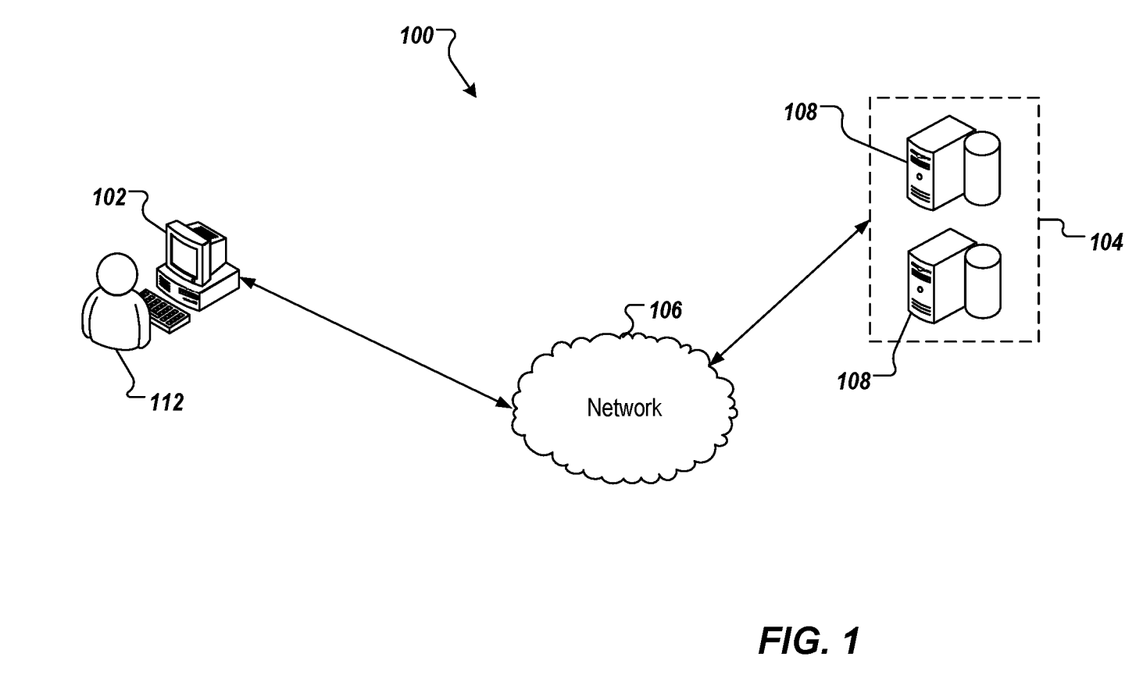
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can provide a first cloud platform, to which a legacy application is typically deployed by executing custom scripts in a set of custom scripts, and can provide a second cloud platform, to which the legacy application is to be deployed using a set of images, as described in further detail herein. For example, the first cloud platform can be provided as a private cloud platform that is provisioned for an enterprise, and the second cloud platform can be provided as a public cloud platform that is provisioned for multiple enterprises.

In some implementations, the server system 104 includes an image derivation system that enables deployment of applications using a set of images. In some examples, the set of images includes a base image, one or more intermediate derived images, and one or more final derived images. The final derived images are specific to respective programming languages and are used to instantiate instances of application components within containers on a cloud platform. In some examples, the final derived images each include a common script that is provided from a set of custom scripts that are executed for deployment of the application in. In some examples, the common script is provided from the set of custom scripts that are executed for deployment of the application in the first cloud platform, while the final derived image is used to deploy the application in the second cloud platform. For example, the second cloud platform deploys the application to one or more containers using the final derived image(s), the one or more containers being managed by a container orchestration system, such as Kubernetes.

Figure 2:
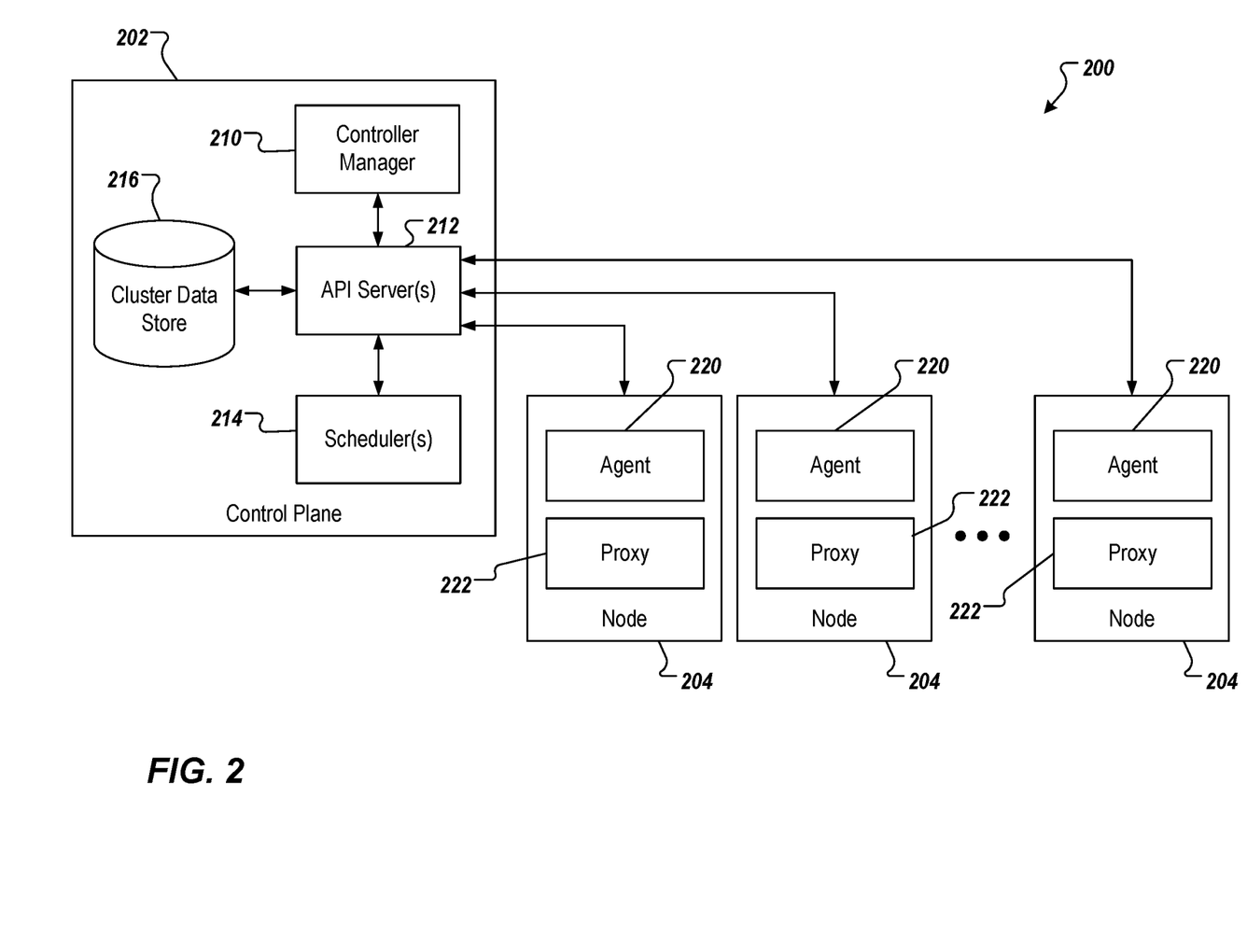
FIG. 2 depicts an example container orchestration architecture.

FIG. 2 depicts an example container orchestration architecture 200. In the depicted example, the example container orchestration architecture 200 represents deployment of a portion of the container orchestration system Kubernetes introduced above. More particularly, the example architecture 200 represents a basic structure of a cluster within Kubernetes.

In the example of FIG. 2, the example architecture 200 includes a control plane 202 and a plurality of nodes 204. Each node 204 can represent physical worker machines and are configured to host pods. In Kubernetes, a pod is the smallest deployable unit of resources, and each pod is provided as one or more containers with shared storage/network resources and a specification for how to run the containers. In some examples, a pod can be referred to as a resource unit that includes an application container. The control plane 202 communicates with the nodes 204 and is configured to manage all of the nodes 204 and the pods therein.

In further detail, the control plane 202 is configured to execute global decisions regarding the cluster as well as detecting and responding to cluster events. In the example of FIG. 2, the control plane 202 includes a control manager 210, one or more application programming interface (API) server(s) 212, one or more scheduler(s) 214, and a cluster data store 216. The API server(s) 212 communicate with the nodes 204 and exposes the API of Kubernetes to exchange information between the nodes 204 and the components in the control plane 202 (e.g., the cluster data store 216). In some examples, the control plane 202 is set with more than one API server(s) 212 to balance the traffic of information exchanged between the nodes 204 and the control plane 202. The scheduler(s) 214 monitor the nodes 204 and execute scheduling processes to the nodes 204. For example, the scheduler(s) 214 monitors events related to newly created pods and selects one of the nodes 204 for execution, if the newly created pods are not assigned to any of the nodes 204 in the cluster.

The cluster data store 216 is configured to operate as the central database of the cluster. In this example, resources of the cluster and/or definition of the resources (e.g., the required state and the actual state of the resources) can be stored in the cluster data store 216. The controller manager 210 of the control plane 202 communicates with the nodes 204 through the API server(s) 212 and is configured to execute controller processes. The controller processes can include a collection of controllers, and each controller is responsible for managing at least some or all of the nodes 204. The management can include, but is not limited to, noticing and responding to nodes when an event occurs, and monitoring the resources of each node (and the containers in each node). In some examples, the controller in the controller manager 210 monitors resources stored in the cluster data store 216 based on definitions of the resource. As introduced above, the controllers also verify whether the actual state of each resource matches the required state. The controller is able to modify or adjust the resources to mitigate under- and over-provisioning of resources.

In some examples, the controllers in the controller manager 210 should be logically independent of each other and be executed separately. In some examples, the controller processes are all compiled into one single binary that is executed in a single process to reduce system complexity. It is noted the control plane 202 can be run/executed on any machine in the cluster. In some examples, the control plane 202 is run on a single physical worker machine that does not host any pods in the cluster.

In the example of FIG. 2, each node 204 includes an agent 220 and a proxy 222. The agent 220 is configured to ensure that the containers are appropriately executing within the pod of each node 204. The agent 220 is referred to as a kubelet in Kubernetes. The proxy 222 of each node 204 is a network proxy that maintains network rules on nodes 204. The network rules enable network communication to the pods in the nodes 204 from network sessions inside or outside of the cluster. The proxy 222 is a kube-proxy in Kubernetes.

In some examples, each node 204 can be provisioned for a respective tenant. For example, an application executed in the cluster of the cloud computing environment can be provisioned for multiple tenants (e.g., each tenant being an enterprise, each enterprise having one or more users that interact with the application). In some examples, a first set of the nodes 204 can be provisioned for a first tenant, and a second set of the nodes 204 can be provisioned for a second tenant. In some examples, each node 204 can be described as a compute instance that provides computing resources (e.g., processors, memory) for executing one or more instances of the application.

In accordance with implementations of the present disclosure, a final derived image is provided to enable deployment of an instance of a legacy application to a node 204. More particularly, the final derived image is processed to provide a container within the node 204, the instance of the legacy application being executed within the container.

Figure 3:
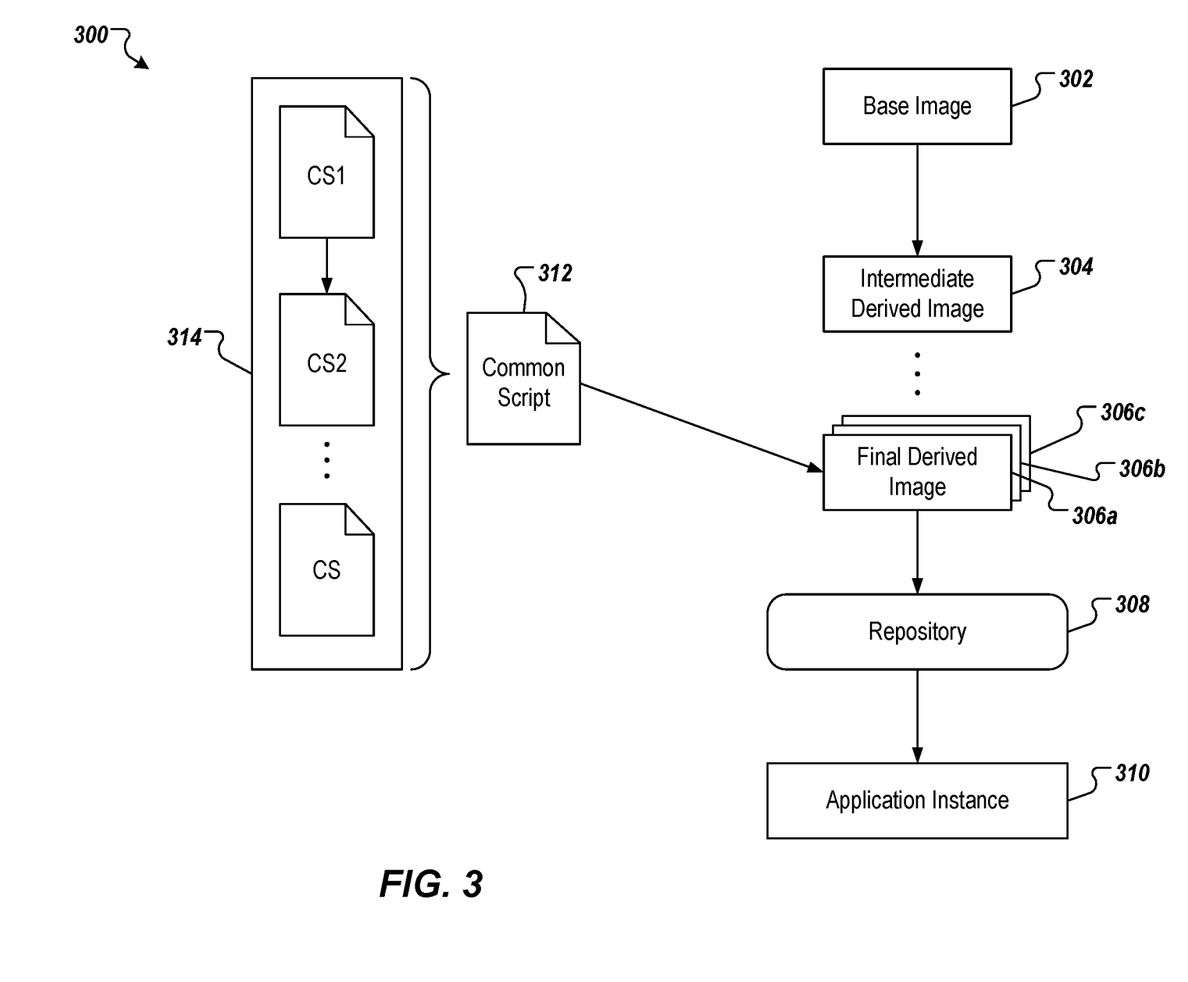
FIG. 3 depicts example image derivation in accordance with implementations of the present disclosure.

FIG. 3 depicts example image derivation 300 in accordance with implementations of the present disclosure. The example of FIG. 3 includes a base image 302, an intermediate derived image 304, a set of final derived images 306 which can include 306a, 306b, and 306c, a repository 308, an application instance 310, a set of customized scripts 314, and a common script 312. As described in further detail herein, the final derived images 306 are provided based on the intermediate derived image 304, which is provided based on the base image 302. Each final derived image 306 is specific to a programming language (e.g., Java, Perl, Python). Although a single intermediate derived image 304 is depicted, it is contemplated that multiple intermediate derived images can be provided over multiple iterations. The final derived images 306 each include the common script 312, which is provided from the set of custom scripts 314. The final derived images 306 are stored in a repository, and can be processed to deploy an instance of a legacy application within a cloud platform. For example, the final derived images 306 can be processed to deploy the application instance 310 for execution within a container of the cloud platform.

In some examples, the base image 302 can be used to derive subsequent images. For purposes of non-limiting illustration, Docker can be considered, in which an initial image can be selected from a registry of initial images (e.g., CentOS image, Ubuntu image) that can be accessed through an image designer. An initial image can be provided as a Linux image that is absent specificity to a particular programming language (e.g., Java, Perl, Python). An initial image can be selected and the base image 302 can be provided from the initial image. Listing 1 provides example content of an example base image:

FROM centos:8
RUN yum install -y perl-5.22.1 tar rsync yum-utils sudo
    net-snmp net-snmp-devel nscd openssh-server send-
    mail rsyslog screen lsscsi rpcbind nfs-utils net-tools nc
    iftop unixODBC unixODBC-devel perl-DBD-ODBC
    httpd lsof python36 python3-croniter chrony hdbcli-
    ent2     j2sdk1.8.0_161_x86_64-aribacacerts
    j2sdk_180_302          x86-64-an-tzdata2021a-ca
    j2sdk_180_302_x86-64-ca wget jq procps xorg-x11-
    server-Xvfb libnsl compat-openssl10 python3-psutil
ENV PATH="/usr/local/tools/perl-5.22.1/bin:${PATH}"
Adding env variable to fetch java files from jre folder
ENV JAVA_HOME=/opt/jdk
    JDKROOT=/opt/jdk
    RENEW_TOKEN=true
    RETRY_ATTEMPTS=3
Listing 1: Content of Example Base Image The example of Listing 1 includes a base image determined from an initial image that is a CentOS image (provided by The CentOS Project) that is published to and available from a registry of initial images provided by Docker. In the base image 302 packages can be installed for specificity to a particular programming language (e.g., Java, Perl, Python). In the example base image of Listing 1, packages can be installed for Perl.

With regard to the intermediate derived image 304, an image is used to deploy an instance of an application to a container, and the image includes all dependencies. However, in the case of a legacy application that is deployed based on custom scripts, the application has different dependencies that need to be accounted for. For example, custom scripts in the set of custom scripts can be developed using a first programming language (e.g., Perl, Python), while an instance of the application runs using a second programming language (e.g., Java).

In normal VM-based or enterprise-controlled data centers, a single operating system (OS) image is used, which has all dependencies and modules installed (e.g., Java, Perl, Python). This, however, can result in technical inefficiencies.

For example, a single image can be relatively large in terms of memory and can take a relatively long time (e.g., 12-15 minutes) to execute to and instantiate a container.

Implementations of the present disclosure provide the herein-described derived image process to create different images for respective usage stages that will execute for deployment of the applications. These can include, for example, script execution and application execution. In some examples, script execution is performed using a first derived image with a first programming language setup (e.g., Perl, Python), and application execution is performed using a second derived image with a second programming language setup (e.g., Java).

Listing 2 Provides Example Content of an Example Intermediate Derived Image:

```
FROM docker-repo.com/cs-base-docker/cs-base-docker:
    v-cdfc8c8-2
ADD process.zip process.zip
ADD configs configs
RUN wget --no-verbose https://docker-repo.com/tools/
    jre.zip
RUN unzip -qq jre.zip
COPY scripts/*.sh/var/tmp/
COPY scripts/*.py/var/tmp/
COPY nginx/scripts/init.sh/var/tmp/scripts/init.sh
#Setup Env
ENV HEALTH_CHECK_CMD="ping -c 2 localhost"
    NO_PREFIX=true
    CUSTOM_BUILD_VERSION={{env    "CUSTOM_
        BUILD_VERSION" }}
    DEPLOY_SERVICE=DEP_SERVICE
    COBALT_LANDSCAPE=LANDSCAPE_NAME
    USER_NAME="svckkg"
    CORE_PRODUCT="APP_PATH"
    SERVICE_PORT=8080
    APP_UUID=APPUUID
    TMP=/alloc/logs
    TEMP=/alloc/logs
    LOGSDIR=/alloc/logs
    PRODUCT_PATH="ariba-cobalt-APP    NAME-con-
        tainer"
    COBALT_CLUSTER=COBALT_CLUSTER_NAME
    CATALINA_HOME=/opt/tomcat
    TOMCAT_HOME=/opt/tomcat
    DEPLOYMENT_SERVICE=DEP_SERVICE
    PRODUCT_BUILD_NAME={{env    "CUSTOM_
        BUILD_VERSION" }}
RUN/var/tmp/sharedScript.sh
RUN/var/tmp/startservercommon.sh
```

Listing 2: Content of Example Intermediate Derived Image

The example of Listing 2 includes a reference to a base image (e.g., cs-base-docker:v-cdfc8c8-2). The example of Listing 2 includes execution of configurations (configs) and scripts.

Listing 3 Provides Example Content of an Example Final Derived Image:

```
FROM docker-repo.com/derived-docker-image/derived-
    docker-image:v-advf6c9-4
COPY scripts/*.sh/var/tmp/
COPY pythonTools/common/*.*/var/tmp/
ADD application.zip application.zip
ADD config config
RUN sudo chmod -R+x/var/tmp && rm -r bootstrap.zip
ENV
    IS_TEST_NODE_REQUIRED=isTestNodeRequired\
    RESTORE_PARAM=RESTORE_OPTION\
    IS_PROD=isProdDeployment\
    REALMS_NUM=realmsCount\
    IS_BASEFRAMEWORK_CQ_BQ=isBaseframework
CMD ["/var/tmp/startAppServer.sh" ]
```

Listing 3: Content of Example Final Derived Image

The example of Listing 3 is the final derived image for the application, which provides a container for execution of the application code. The example of Listing 3 includes a reference to an intermediate derived image (e.g., derived-docker-image: v-advf6c9-4). The example of Listing 3 is specific to Python and can be executed to instantiate Python-specific components within a container. The example of Listing 3 includes common scripts (located at scripts/*.sh/var/tmp/) that are executed in instantiating Python-specific components of the application. As discussed above, other final derived images can be provided, such as a Perl-specific final derived image that can be executed to instantiate Perl-specific components within a container. Here, the Python-specific components and the Perl-specific components can rely on commonalities, such as the same configuration, the same packages, and the like, which are already pre-installed through the base image and the intermediate derived image(s). Further, the Perl-specific final derived image can include the common scripts (located at scripts/*.sh/var/tmp/) that are also executed in instantiating Perl-specific components of the application.

With regard to the set of custom scripts 314, and as introduced above, as part of deployment of the application to a first cloud platform (e.g., private cloud platform of a data center controlled by an enterprise), the set of custom scripts are developed and executed. The custom scripts are executed in separate machine (or virtual machine (VM)) before the actual application process runs (e.g., Java VM (JVM)). In such a legacy deployment, because the data center is enterprise-controlled, time and resources are not the constraint. Instead, the focus is on the execution of the custom scripts to deploy the application to the first cloud platform.

However, and in the context of the present disclosure, when it comes to deploying the application to a second cloud platform (e.g., a public cloud platform), time and resource constraints are applied by the orchestration system at the start of the pod, to which the application is to be deployed. For example, the orchestration regularly checks the health of the container and, in some instances, marks the container as unhealthy, kills the container, and instantiates another container. The custom scripts largely deal with database and generation of configurations, and, as such, can take time. In the context of deployment to the second cloud platform, this time can result in a scenario where a container that the application is being deployed to is marked unhealthy and restart executes (e.g., a new container).

To address this issue, implementations begin at the build phase, where the common script 312 is provided from the custom scripts included in the set of custom scripts 314. The common script task is to create required configuration and setup which is required for other follow-up scripts or JVM to execute. The derived images of the present disclosure are created and run the common script. After execution final derived images are provided, which is used in application containers.

An example timeline can be considered to highlight implementations of the present disclosure. The example timeline can include a time $t_1$, at which the base image is executed, a time $t_2$, at which an intermediate derived image is executed, and a time $t_3$, at which one or more final derived images are executed, and a time $t_4$, by which time the respective common scripts of the final derived images have been executed. The times t1-t4 can be referred to as pre-installation steps that pre-install configurations, packages, and the like that may be required for execution of the application. At a time $t_5$, shortly after the time $t_4$, the container orchestration system can check the system health and can find the container to be in a healthy and running state. From this point, each of the final derived images can be used to deploy multiple services of the application across multiple containers without re-execution of the base image, the intermediate derived image(s), or the common scripts. For example, a final derived image for Java-specific components can be used to instantiate instances of the components within a container and a final derived image for Perl-specific components can be used to instantiate instances of the components within a container. Here, none of the configurations, package installations, etc. of the pre-installation steps need be performed, as they have already been executed. In this manner, each container is instantiated relatively quickly as compared to prior approaches.

Figure 4:
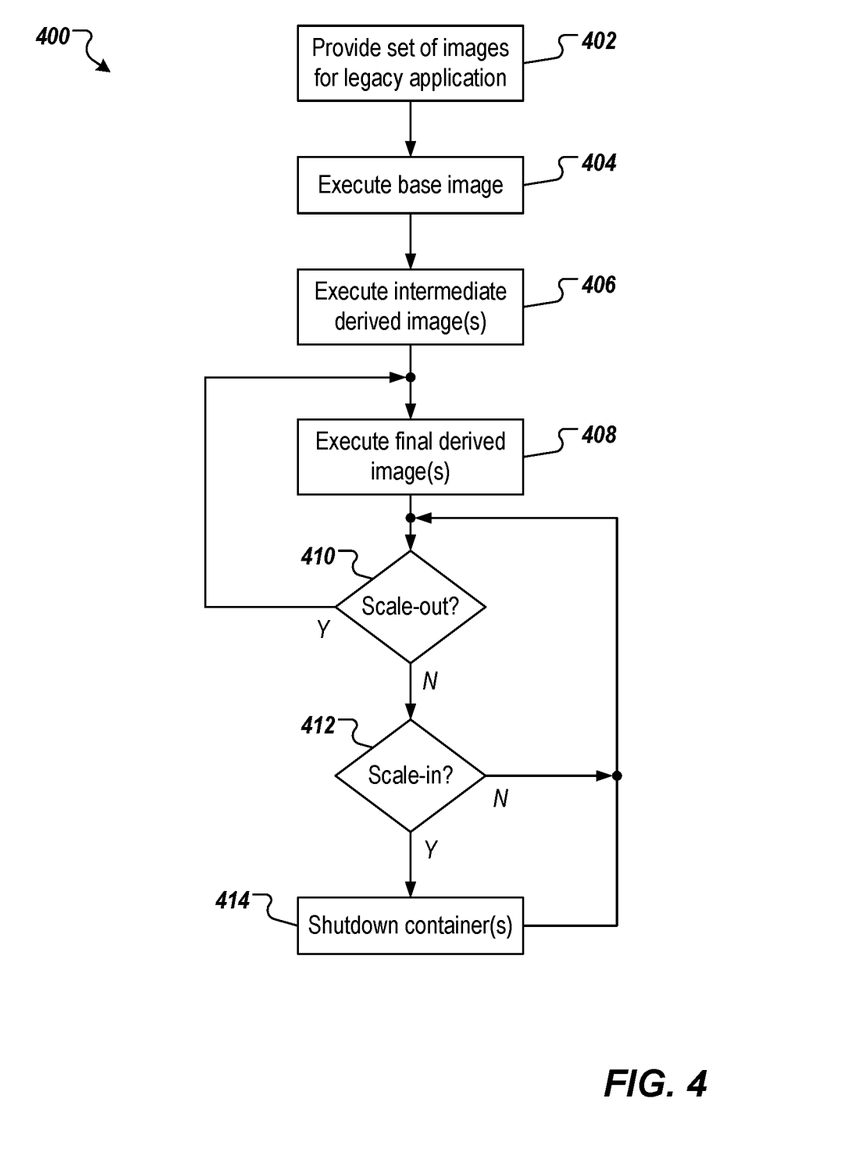
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A set of images is provided for a legacy application (402). For example, and as described in detail herein, a set of images for the legacy application can include a base image, one or more intermediate derived images, and one or more final derived images. Here, a legacy application can include an application that is traditionally deployed using a set of custom scripts that are executed to install configurations, packages, and the like for execution of the application in a private computing environment. A base image is executed (404), and one or more intermediate derived images are executed (406). For example, and as described in detail herein, it can be determined that one or more instances of the application are to be deployed within a cloud computing environment. In response, the base image (404) and the one or more intermediate images (406) are executed to prepare for instantiation of instance(s) of the application. For example, the base image can be executed to provide a base OS and the one or more intermediate derived images can be executed to provide configurations and/or install packages that are needed by the instance(s) of the application. Here, configurations, packages, and the like are pre-installed in the cloud computing environment before instantiating instances of the application. In some examples, execution of an image (e.g., base image, intermediate derived image) includes processing a computer-readable file that records the image and executing instructions recorded in the computer-readable file.

One or more final derived images are executed (408). For example, and as described in detail herein, one or more final derived images are executed to instantiate at least one instance of the application, the instances using the configurations, packages, and the like provisioned through execution of the base image and/or the one or more intermediate derived images. As described herein, each final derived image can include common scripts (e.g., and with reference to Listing 3, located at scripts/*.sh/var/tmp/) that are executed in instantiating language-specific components of the application. In some examples, each final derived image is executed to instantiate a language-specific component of the application within a container (e.g., provide a Java virtual machine (JVM) for execution of the component within the container). Here, and in the case of multiple instances, each of the instances uses the configurations, packages, and the like, which are pre-installed. In this manner, the configurations, packages, and the like need not be re-installed for each instance.

It is determined whether to scale-out the application (410). For example, it can be determined whether additional instances of the application are needed to handle an increased workload. In some examples, whether to scale-out can be determined based on a workload of the application (e.g., if the workload exceeds a threshold workload). In some examples, the workload can be determined based on a number of requests received for execution by the application. In some examples, whether to scale-out can be determined based on a schedule (e.g., scale-out at a predefined time each day). If it is determined to scale-out the application, the example process 400 loops back to execute the one or more final derived images to provide at least one more instance of the application. Here, configurations, packages, and the like are pre-installed in the cloud computing environment before instantiating that at least one more instance of the application. Consequently, time- and resource-efficiencies are gained. That is, because configurations, packages, and the like are pre-installed in the cloud computing environment before instantiating instances of the application, these need not be reinstalled for the at least one more instance of the application.

If it is determined not to scale-out the application, it is determined whether to scale-in the application (412). For example, it can be determined whether the workload has decreased, such that fewer instances of the application are needed. In some examples, whether to scale-in the application can be determined based on a schedule (e.g., scale-in are a predefined time each day). If it is not determined to scale-in the application, the example process 400 loops back. If it is determined to scale-in the application, one or more containers are shutdown (414), and the example process 400 loops back.

Implementations of the present disclosure provide multiple technical improvements. In some examples, the set of images of the present disclosure provide an overall smaller memory footprint than previous approaches that attempt to use a single image (e.g., a single OS image that has all dependencies and modules installed). Further, implementations of the present disclosure enable more rapid instantiation of containers. For example, implementations of the present disclosure have been shown to reduce start-up time of containers by approximately 10-12 minutes per container, achieving start-up times of approximately 2-3 minutes per container. That is, because configurations, packages, and the like are pre-installed in the cloud computing environment through execution of the base image and/or the one or more intermediate images, the configurations, packages, and the like need not be re-installed for each additional instance of the application.

Figure 5:
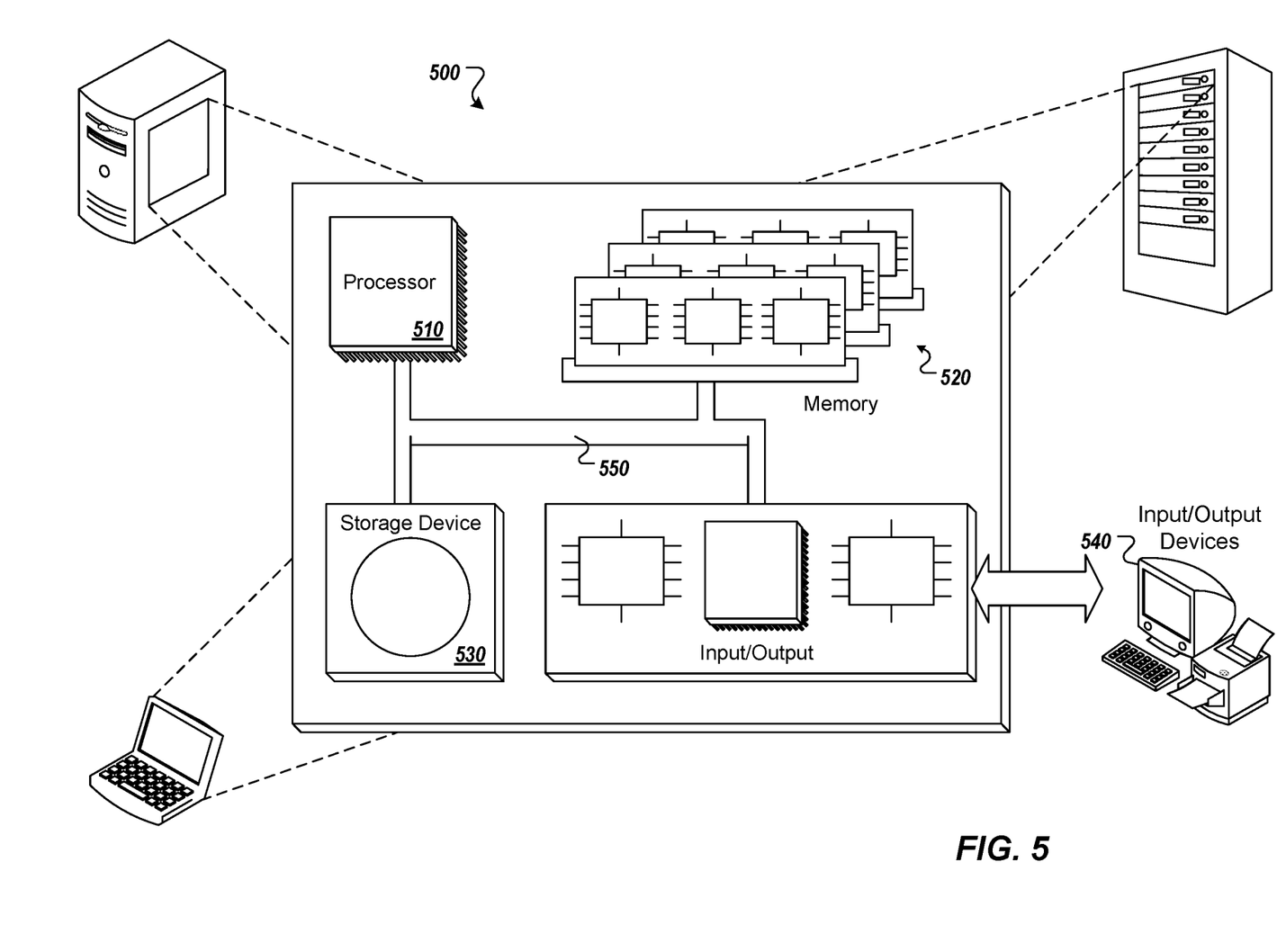
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deploying instances of a legacy application to a public cloud infrastructure, the method being executed by one or more processors and comprising:
    providing, in a repository of a cloud computing environment, a set of images that are executable to deploy one or more instances of an application to the cloud computing environment, the set of images comprising a base image, one or more intermediate derived images, and one or more final derived images;
    executing the base image and the one or more intermediate derived images to configure the cloud computing environment for deployment of at least one instance of the application and to install one or more packages used by instances of the application; and
    executing the one or more final derived images to instantiate that at least one instance of the application within the cloud computing environment.

2. The method of claim 1, wherein execution of the one or more final derived images comprises, for each final derived image, executing a common script.

3. The method of claim 2, wherein the common script comprises at least a portion of each custom script in a set of custom scripts, the set of custom scripts being executable to deploy the application in a private computing environment.

4. The method of claim 1, further comprising executing the one or more final derived images to instantiate at least one additional instance of the application within the cloud computing environment, the at least one additional instance of the application using one or more of configurations and packages installed through execution of one or more of the base image and the one or more intermediate derived images.

5. The method of claim 1, wherein execution of the base image, the one or more intermediate derived images, and the one or more final derived images is performed in response to determining that the at least one instance of the application is to be deployed to the cloud computing environment.

6. The method of claim 1, wherein each final derived image is specific to a programming language.

7. The method of claim 1, wherein each of the one or more intermediate derived images comprises a reference to the base image, and each of the one or more final derived images comprising a reference to at least one intermediate derived image.

8. A non-transitory computer-readable storage medium coupled to one or more processors and having instructions stored thereon which, when executed by the one or more processors, cause the one or more processors to perform operations for deploying instances of a legacy application to a public cloud infrastructure, the operations comprising:
providing, in a repository of a cloud computing environment, a set of images that are executable to deploy one or more instances of an application to the cloud computing environment, the set of images comprising a base image, one or more intermediate derived images, and one or more final derived images;
executing the base image and the one or more intermediate derived images to configure the cloud computing environment for deployment of at least one instance of the application and to install one or more packages used by instances of the application; and
executing the one or more final derived images to instantiate that at least one instance of the application within the cloud computing environment.

9. The non-transitory computer-readable storage medium of claim 8, wherein execution of the one or more final derived images comprises, for each final derived image, executing a common script.

10. The non-transitory computer-readable storage medium of claim 9, wherein the common script comprises at least a portion of each custom script in a set of custom scripts, the set of custom scripts being executable to deploy the application in a private computing environment.

11. The non-transitory computer-readable storage medium of claim 8, wherein operations further comprise executing the one or more final derived images to instantiate at least one additional instance of the application within the cloud computing environment, the at least one additional instance of the application using one or more of configurations and packages installed through execution of one or more of the base image and the one or more intermediate derived images.

12. The non-transitory computer-readable storage medium of claim 8, wherein execution of the base image, the one or more intermediate derived images, and the one or more final derived images is performed in response to determining that the at least one instance of the application is to be deployed to the cloud computing environment.

13. The non-transitory computer-readable storage medium of claim 8, wherein each final derived image is specific to a programming language.

14. The non-transitory computer-readable storage medium of claim 8, wherein each of the one or more intermediate derived images comprises a reference to the base image, and each of the one or more final derived images comprising a reference to at least one intermediate derived image.

15. A system, comprising:
a computing device; and
a computer-readable storage device coupled to the computing device and having instructions stored thereon which, when executed by the computing device, cause the computing device to perform operations for deploying instances of a legacy application to a public cloud infrastructure, the operations comprising:
providing, in a repository of a cloud computing environment, a set of images that are executable to deploy one or more instances of an application to the cloud computing environment, the set of images comprising a base image, one or more intermediate derived images, and one or more final derived images;
executing the base image and the one or more intermediate derived images to configure the cloud computing environment for deployment of at least one instance of the application and to install one or more packages used by instances of the application; and
executing the one or more final derived images to instantiate that at least one instance of the application within the cloud computing environment.

16. The system of claim 15, wherein execution of the one or more final derived images comprises, for each final derived image, executing a common script.

17. The system of claim 16, wherein the common script comprises at least a portion of each custom script in a set of custom scripts, the set of custom scripts being executable to deploy the application in a private computing environment.

18. The system of claim 15, wherein operations further comprise executing the one or more final derived images to instantiate at least one additional instance of the application within the cloud computing environment, the at least one additional instance of the application using one or more of configurations and packages installed through execution of one or more of the base image and the one or more intermediate derived images.

19. The system of claim 15, wherein execution of the base image, the one or more intermediate derived images, and the one or more final derived images is performed in response to determining that the at least one instance of the application is to be deployed to the cloud computing environment.

20. The system of claim 15, wherein each final derived image is specific to a programming language.

* * * * *